(12) United States Patent
Barclay (10) Patent No.: US 7,757,640 B2
(45) Date of Patent: Jul. 20, 2010

(54) DEVICE FOR PREVENTING CRIBBING OR SUCKING IN HORSES

(76) Inventor: Richard Barclay, Office 53, School Road, Ferny Creek, Victoria 3786 (AU)

( * ) Notice: Subject to any disclaimer, the term of this patent is extended or adjusted under 35 U.S.C. 154(b) by 692 days.

(21) Appl. No.: 11/597,029

(22) PCT Filed: May 21, 2005

(86) PCT No.: PCT/AU2005/000723

§ 371 (c)(1),
(2), (4) Date: Jan. 17, 2007

(87) PCT Pub. No.: WO2005/112616

PCT Pub. Date: Dec. 1, 2005

(65) Prior Publication Data

US 2008/0022944 A1    Jan. 31, 2008

(30) Foreign Application Priority Data

May 21, 2004    (AT)    .............................. 2004902719

(51) Int. Cl.
*A01K 15/02* (2006.01)
(52) U.S. Cl. ........................ 119/822; 119/908; 119/719
(58) Field of Classification Search .................. 119/822, 119/859, 712, 908, 719
See application file for complete search history.

(56) References Cited

U.S. PATENT DOCUMENTS

| 487,461 A | 12/1892 | Whitefield |
| 3,687,112 A | 8/1972 | Henderson |
| 4,539,937 A | 9/1985 | Workman |
| 4,945,860 A | 8/1990 | Walker |
| 5,722,352 A | 3/1998 | Leatherman |
| 5,957,093 A | 9/1999 | Balaun |
| 6,116,192 A | 9/2000 | Hultine et al. |
| 6,453,849 B1 | 9/2002 | Mosby |
| 6,651,592 B2 * | 11/2003 | Maddox et al. .............. 119/720 |

FOREIGN PATENT DOCUMENTS

| DE | 2939371 A1 | 4/1981 |
| FR | 2591425 A1 | 6/1987 |
| GB | 190417814 A * | 7/1905 |

OTHER PUBLICATIONS

PCT International Search Report, PCT/AU2005/000723, dated Jun. 16, 2005.
Translation of DE2939371 A1 (7 pages).

* cited by examiner

*Primary Examiner*—Yvonne R. Abbott
(74) *Attorney, Agent, or Firm*—TraskBritt (57) ABSTRACT

An electric shock device in use attached to an animal such as a horse or other equine animal to discourage an undesirable behavior such as wind-sucking or cribbing, the device including: an attachment for locating the device on the neck of the animal; an electric charge source operatively connected to the attachment; at least one electrode for applying an electric pulse from the electric device to the animal, the electrode electrically connected to the charge source; and a hinged lever member movable by the performance of the undesirable behavior by the animal. The undesirable behavior alone causing sufficient movement or the type, of movement of the lever member required to activate the electric device leading to the discharge of the electric pulse from the electric device, thereby causing the electric pulse to be generated and delivered through the at least one electrode to the animal.

17 Claims, 4 Drawing Sheets

DEVICE FOR PREVENTING CRIBBING OR SUCKING IN HORSES

This invention relates to devices for applying an electric shock to an animal to effect behaviour modification. More particularly, this invention relates to a device for modifying equine behaviour associated with wind sucking using an electric pulse.

BACKGROUND ART

The following references to and descriptions of prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the present invention of which the identification of pertinent prior art proposals is but one part.

Animal behaviour modification is an ancient and intensely active field of human endeavour. Undesirable animal behaviour may manifest in actions that are unpleasant or dangerous to humans or other animals, or are potentially injurious to the animal itself. Behaviours in dogs, cattle and horses have particularly important consequences for humans in terms of quality of life issues and industry applications involving such animals.

A major behavioural problem in equine related industries (including the racing industry) and agricultural industries involves wind sucking or cribbing by equine animals. This is a self destructive and psychologically addictive behaviour. The behaviour is particularly observed in horses which become frustrated and bored when constrained in relatively small areas such as stables or small feedlots. A horse suffering from this condition typically aggressively bites on a rail or upper structure of similar height, arches its neck and sucks in air. The associated action can cause inflammation of the larynx and windpipe, stomach convulsions and generally results in a deterioration of the condition, including muscle wasting, of the animal over time.

Devices have been proposed to overcome this affliction and the field is the subject of considerable interest due to the high monetary value associated with equine stock, particularly in the racing industry. One such proposal involves a device with physical protrusions which are designed to press on the horse's throat when the animal exhibits wind sucking behaviour. However, in practice such physical devices do not provide a sufficient deterrent over time. The animal tends to develop a tolerance to the discomfort caused by the protrusions and the animal may continue or resume the behaviour despite the presence of the device.

Electric shock devices have been considered for the modification of animal behaviour generally. However, such devices pose safety risks for the animal, particularly where there is the potential for the device to be permanently or repeatedly activated. In the worst case, such deficiencies may result in injury to the animal. At best, such devices may result in the draining of the charge source and cessation of operation of the device with the inevitable resumption of the undesirable behaviour. Moreover, such prior art proposals are ineffective in targeting the specific wind-sucking behaviour and may be inappropriately activated by other, sometimes acceptable, behaviours such as rearing and frolicking.

There is therefore a need for device that overcomes the aforementioned disadvantages of the prior art or, at least, provides a useful alternative thereto.

STATEMENT OF INVENTION

In one aspect of the invention, there is provided an electric shock device in use attached to a horse or other equine animal to discourage wind-sucking behaviour, said device including:

an attachment for locating the device on the neck of said animal;

an electric charge source operatively connected to said attachment;

electrode means for applying an electric pulse to said animal, said electrode means electrically connected to said charge source; and activation means activated in response to the performance by said animal of said wind-sucking behaviour alone, the activation of said activation means leading to the discharge of said electric pulse from said electric charge source.

The activation of the activation means by the undesirable behaviour "alone" means that other behaviours such as frolicking, rearing, galloping and preening in the case of equine animals, does not inadvertently activate the activation means. For this reason the activation means must be specifically configured to be responsive to the characteristic body or other movements in the area associated with and characterising the undesirable behaviour, whilst being entirely non-reactive to other body movements apart from the undesirable behaviour. In a particularly preferred arrangement, the activation means is activated in response to the constriction of either the omohyoideus and/or the sterno thyrohyoideus muscle or muscle group of the animal. The omohyoideus muscle acts to move the hyoid bone at the base of the tongue. The sterno thyrohyoideus muscle or muscle group assists in swallowing and sucking actions, thereby being directly involved in the performance of the wind-sucking action.

The device may include an electrical circuit having a blocking means to prevent the delivery to the animal of a further pulse through the electrodes immediately following the electric pulse.

The blocking means is adapted to prevent injury to the animal for example, where the animal does not immediately cease the undesirable behaviour. The blocking means may also prevent premature drainage of the power source (where the power source is a battery or otherwise limited power source). The blocking means may form part of the circuit or the pressure sensitive means.

The activation means may include a pressure sensitive means. The pressure sensitive means may be a pressure sensitive switch which will not re-set until the pressure applied by the animal to the pressure sensitive switch is released. The pressure sensitive or activation means may comprise a switch activatable upon the application of pressure thereto. The switch may be spring-biased, preferably to return the switch to the "off" position following activation. The circuit may be constructed to deliver no more than a single pulse for each time that the activation means is activated to prevent the animal receiving more than one pulse for each time that the undesirable behaviour is exhibited. This single pulse per activation feature advantageously protects the safety of the animal. Accordingly, following the delivery of a first pulse, the device will not deliver a further pulse until the activation means is released following cessation of the undesirable behaviour and the animal recommences the undesirable behaviour whereby a further second pulse will be delivered. The activation means may therefore be reset after the animal ceases the undesirable behaviour on each occasion.

The blocking means may be incorporated into the circuit and may comprise circuitry components adapted to deliver a single pulse following activation of the activation means, but may block the rebuilding of charge until the activation means is released or reset. The circuit may include an inverter arrangement. The circuit may further comprise a transformer and/or transistor adapted to deliver a relatively high voltage low current pulse to the electrodes.

The animal may be involved in any of a variety of industries or applications and may include any of a variety of animals such as circus performing animals, domestic pets, farm animals, police and military animals, but the invention is considered to have particular relevance to equine animals, including horses.

The undesirable behaviour may be any of a variety of behaviours which it is considered desirable to modify and which are associated with a characteristic movement which may be used to activate the activation means. The attachment may take on a number of forms, depending on the part of the animal on which it is to be located. The activation means may be located adjacent the part of the animal which expands or protrudes during the execution of the undesirable behaviour. Of particular interest in relation to the present invention is the undesirable behaviour of wind sucking. In the action of a horse wind sucking, the neck is arched, the neck muscles strongly contract resulting in the localised expansion of muscles and structures associated with the larynx and tongue, in particular the omohyoideus and/or the Sterno thyrohyoideus muscle or muscle group of the animal. Accordingly, in the case of wind sucking, the attachment may be located on the neck of the horse, with the electrode means abutting or in close proximity to the larynx. For example, the attachment may be located just under the horse's jaw line. The activation means may be in the form of pressure sensitive means such as a spring biased lever or tongue member and this may be located on or near the horse's larynx.

When located on the relevant animal part, the attachment may be anchored at one or two ends by clips, clamps, buckles, fasteners, hook and loop type material and the like.

Preferably, as in the case of wind sucking, the attachment comprises a collar in the form of a loop surrounding the animal's neck. The collar may be rigid or flexible or a combination of both. The collar may vary in cross-section throughout its length, for example, to accommodate greater flexing at one or more sections of the collar. For example, the collar may be U-shaped and the ends or arms of the collar may be tapered to be more flexible than the central portion. The collar may be contoured to accommodate the shape of the part of the animal and to provide a comfortable fit that does not irritate the animal when behaving normally. The collar may have a U- or V-shape whereby the free ends of the U or V are securable to one another around the part of the animal by clips, clamps, buckles, fasteners, hook and loop type material and the like.

However, the collar is preferably of generally constant cross-section when attached to the animal. The attachment may comprise a substantially rigid portion and a flexible, adjustable portion to adapt the attachment to different sized animals. The collar may comprise a rigid U-shaped portion with arms capable of limited flexion. The arms may be extended by a flexible strap, adjustable in length and securable one length of strap to the other, by buckle or clip means. The rigid portion may be formed from plastic, metal (such as aluminium) or leather material optionally reinforced, e.g. with wire. Preferably, the attachment comprises a rigid portion made of plastic with a pair of spaced arms capable of minor flexion and terminating in a complementary and attachable pair of straps made of leather or polyester with adjustable length buckles.

The electrical charge source is a power source. The power source includes any suitable source of charge capable of being conveniently stored or generated. The electrical charge source may include a power source derived from a mains power source to which the attachment is connected by a long lead. However, in practical terms, an independent electrical charge source mountable to the attachment is preferred.

Accordingly, a battery power source may, in some circumstances, be appropriate and of good utility. The battery power source may comprise a single battery, such as a 9 volt battery typically used in low current applications such as smoke detectors. Alternatively, the battery power source may comprise multiple battery cells in series or parallel. Preferably, the multiple battery cells are provided in parallel to enable lower voltage batteries such as 1.5 volt battery cells to be used to create a higher voltage source. Indeed, the skilled person will appreciate that a low current pulse is desirable to minimise injury or distress to the animal. However, the delivery of a relatively high voltage shock (i.e. in the range 50 to 300 volts) to the animal may be required to effect the desired modification in behaviour.

In some circumstances solar powered or motion powered devices may be adequate to provide a trickle charge which can be used to build a high capacitance charge over time and such arrangements may have utility in situations where animals are likely to be left unattended for extended periods. However, in most situations, a battery power source will be suitable.

Alternatively, the power source may comprise a piezoelectric device capable of delivery an electric pulse upon mechanical activation. The activation means may be configured whereby the undesirable behaviour involves a movement of sufficient force to activate the piezo-electric device and deliver the electric pulse.

For example, the activation means may comprise a lever member adapted to translate a broad undesirable movement of the animal into a small movement of sufficient force to compress a spring-biased piezo device to activate same. The lever member may include an elongate member hinged at or towards a hinged end and a free or more movable remote end. The piezo-electric device may be located near the hinge to achieve the required leverage. Accordingly, on compression of the lever member, primarily by a force applied to the remote end, the piezo-electric device may be activated by a multiplied force due to the leverage affect, thereby causing an electric pulse to be generated and delivered through the electrodes to the animal.

The electrode means may comprises one, two or more electrodes. The electrodes will essentially comprise a high conductivity material such as metal and a variety of metal and metal coated electrodes could be employed to suitable effect. Suitable electrode/terminal materials include aluminium, stainless steel or chrome-covered plastic as these materials are most likely than more oxidisable materials to cause discomfort or skin irritations to the animal. Preferably, the electrodes are in permanent contact with the relevant part of the animal, although it is conceivable that the electrodes may be spaced from the part when normal behaviour is exhibited and only brought into contact with the part of the animal when it exhibits the undesirable behaviour. A similar situation applies to the pressure sensitive means, whereby the pressure sensitive means and the electrodes only make good contact with the part of the animal when the undesirable behaviour is exhibited.

In another embodiment, the activation means may be a switch or press-button adapted to be activated by hand by an operator, such as a person walking the animal on a lead or by the reins. The attachment may therefore include a collar or bridle, attached to the animal's neck, head, and/or withers. In the case of a collar or bridle, the electrodes will still be located on the animal's neck in position to respond to wind-sucking behaviour.

As previously mentioned, the device may include a piezo-electric device. The piezo-electric device may include a piezo switch capable of delivering a high voltage pulse to the electrodes without the need for a separate power source or electric circuit.

In particular, the activation means may include a lever member configured to translate the movement of the animal associated with wind-sucking into a small movement of sufficient force to activate said piezo-electric device being a spring-biased piezo device by compression of the spring.

The lever member may include any number of configurations, but preferably is shaped to be comfortable at rest on the animal. The lever member may have multiple deflectable arms or a single deflectable panel. The lever member may include an elongate member hinged at or towards a hinged end and a free or more movable remote end. The piezo-electric device may be located near the hinge to achieve the required leverage. On compression of the lever member, primarily by a force applied to the (most exposed) remote end, the piezo-electric device may be activated by the leverage affect, thereby causing the electric pulse to be generated and delivered through the electrode means to the animal.

An electric shock device may in use be attached to an animal to discourage an undesirable behaviour associated with a predictable physical movement. The device may include:

an attachment for locating the device on a part of the animal associated with the undesirable behaviour;

an electric charge source operatively connected to the attachment;

electrode means for applying an electric pulse to the animal, the electrode means electrically connected to the charge source; and a hinged lever member movable by the performance by the animal of the undesirable behaviour alone, the movement of the lever member causing the electric charge source to activate leading to the discharge of the electric pulse from the electric charge source.

The activation of the activation means by the undesirable behaviour "alone" means that other behaviours such as frolicking, rearing, galloping and preening in the case of equine animals, and simple straining at the lead in the case of dogs, does not inadvertently activate the activation means. For this reason the activation means must be specifically configured to be responsive to the characteristic body movements or other features in the area associated with and characterising the undesirable behaviour, whilst being entirely non-reactive to other body movements apart from the undesirable behaviour.

The electrical charge source may be a spring biased piezo-electric device capable of delivering an electric pulse upon mechanical activation by compression, the lever member applying the compressive force when moved by the performance by the animal of the undesirable behaviour alone. The undesirable behaviour may be expressed by the action or activation of at least one muscle or muscle group. At least one muscle may belong to the group consisting of the omohyoideus and stemothyrohyoideus muscles. Of particular interest in the present invention is the undesirable behaviour of wind-sucking where the animal is a horse or other equine animal.

BRIEF DESCRIPTION OF THE DRAWINGS

Possible and preferred features of the present invention will now be described with particular reference to the accompanying drawings. However it is to be understood that the features illustrated in and described with reference to the drawings are not to be construed as limiting on the scope of the invention. In the drawings.

DETAILED DESCRIPTION OF THE DRAWINGS

Figure 1:
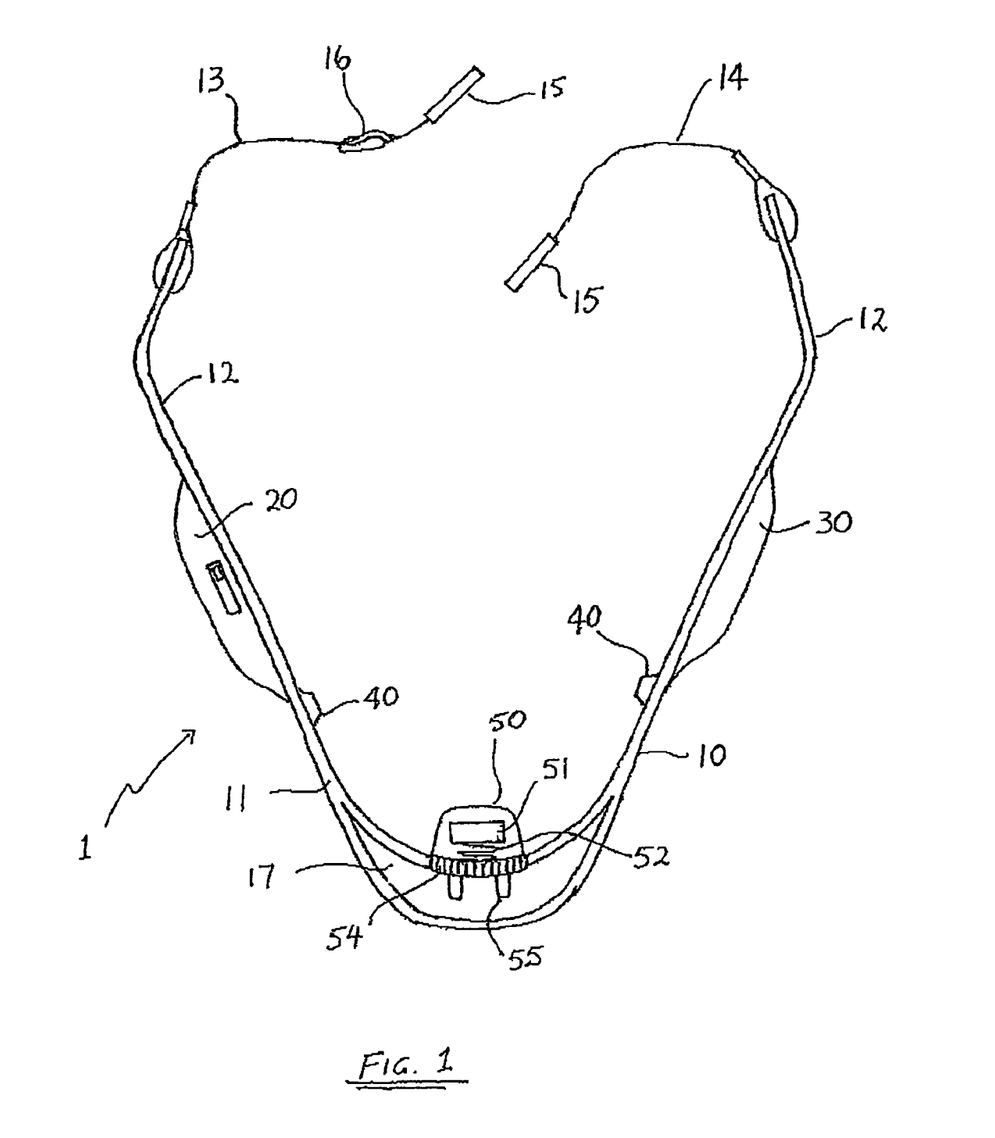
FIG. 1 is a top plan view of a device according to a first embodiment.

In FIG. 1 there is shown a device 1 comprising an attachment in the form of a collar. The collar 10 includes a U-shaped rigid collar 11 terminating in slightly flexible bent arms 12. The flexible arms 12 each terminate in a flexible strap 13, 14 which in turn terminate in complementary attachable buckles 15. The strap 13 is length adjustable by in line buckle 16. It can be seen that when buckles 15 are releasably secured together that the loop of the collar 10 is closed with a fixed circumference.

The device 1 further includes an inverter module 20, a battery pack 30, electrodes/terminals 40 and activation means in the form of a pressure sensitive switch 50.

Figure 2:
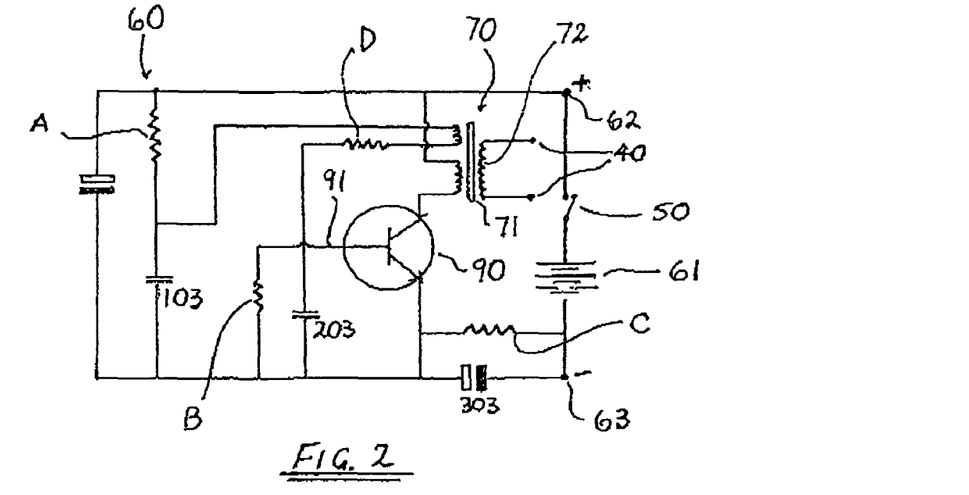
FIG. 2 is a circuit drawing according to a first embodiment of the invention.

Referring to FIG. 2, there is shown a circuit 60 showing the electrical connections between the various components. The circuit 60 includes a battery 30 comprising a positive terminal 62 and negative terminal 63 adapted to create a potential difference. The circuit includes a transformer 70 connected to terminals 40 for delivering an electrical pulse. The transformer 70 includes an iron core 71 with windings 72. When the pressure sensitive switch 50 is activated, the inverter circuit 60 produces a short duration high voltage (approximately 170V) shock output to the electrodes 40 on the horse's neck. An electrolytic capacitor 303 and 1 KOhm resistor 64 combine to limit the duration of the electrical pulse.

Figure 3:
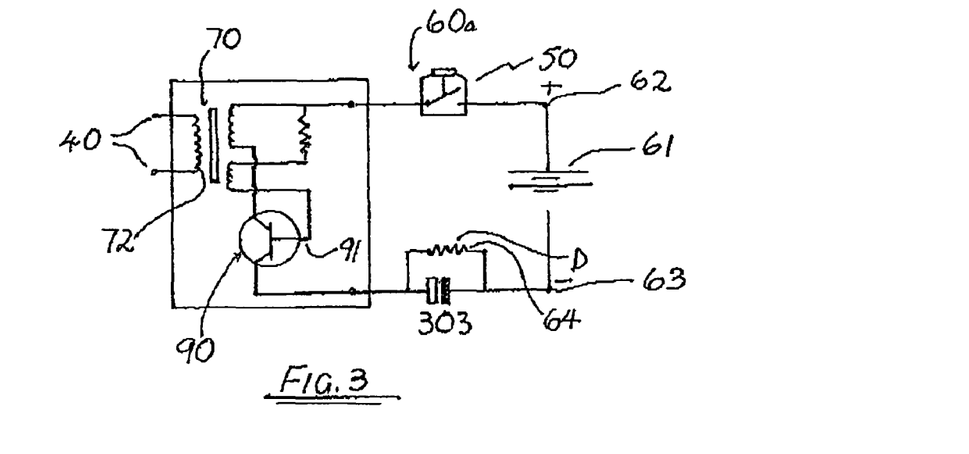
FIG. 3 is a circuit drawing according to a second embodiment.

FIG. 3 shows a circuit 60a in abbreviated form compared to the circuit 60 and emphasises the capacity of the circuit 60a to deliver a high voltage pulse of limited duration due to the inclusion of the electrolytic capacitor 303 and the 1 KOhm resistor 64.

In operation the device 1 by the collar 10 is attached to the throat region on the neck of a horse so that the pressure sensitive switch 50 abuts the horse's larynx, the strap 13 is adjusted and the buckles 15 are attached and so that the collar 10 sits comfortably on the horse's neck when it is behaving normally. The operator should be able to insert two or three fingers underneath the strap 14 with ease without causing the horse discomfort to ensure that the collar 10 is correctly adjusted. The inverter module 20 includes an "on/off" switch which can be turned on to make the device 1 operational.

Figure 4:
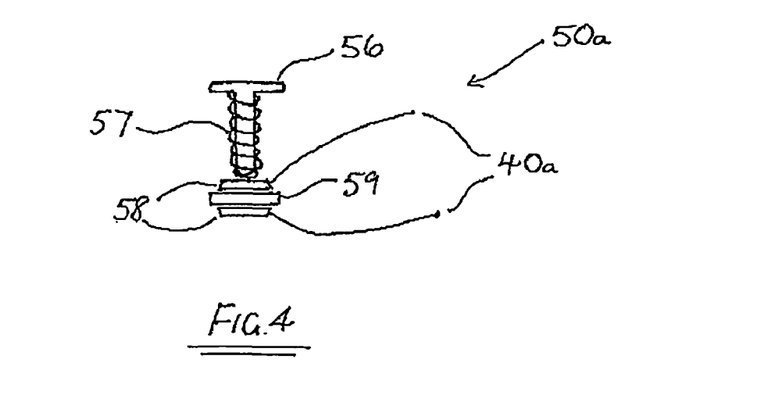
FIG. 4 is a schematic drawing of a piezo switch which may be used in a third embodiment.

The switch 50 includes a spring biased button 51 which is biased to the "off" position by spring 52. The walls 53 of the switch 50 are made of a rubber or flexible collapsible plastic material to maintain the internal components of the switch 50 in isolation from the external environment, but to enable the button to make an electrical connection via terminals 55 to complete the circuit 60a when compressed and activated. The base of the switch 50 includes a threaded locking nut 54 as well as the terminals 55. Connecting wires are not shown.

When the horse exhibits wind sucking or cribbing behaviour, the omohyoideus and/or the Sterno thyrohyoideus muscle or muscle group in its neck are expanded and impinge on the switch whereby to depress the button 51. This completes the circuit 60 so that a 170 volt pulse of very low amperage (about 0.1 amps) is delivered through the electrodes 40 to the horse's neck region giving the animal a corrective shock effective to stop the undesirable behaviour. If the animal continues the wind sucking behaviour even after the shock is delivered, the circuit 60 will not recharge whilst the button 51 is depressed and the circuit is closed. Only when the animal withdraws from the wind sucking behaviour will the button return to the "off" position, thereby opening the circuit and allowing the circuit 60 recharge.

The battery pack 30 includes 4-6 1.5 volt batteries in parallel whereby to provide a supply voltage of 6-9 volts. Alternatively, a standard 9 volt battery may be used. The current delivered through the electrodes 40 is, of course, low amperage and may be between 0.1 mA to 5 amps, but preferably about 0.1-1 amps.

The rigid U-shaped portion 11 is made from injection moulded plastic such as polypropylene. The rigid portion 11 may include a cavity 17 to provide a protected zone for componentry but this feature is not essential. The connecting wires of the circuit may extend through moulded conduits in the walls of the rigid portion 11 to protect them from any rough impact or abrasive treatment dealt out by the animal, for example during play with other animals. For this reason, the battery and inverter modules 20,30 may be incorporated in bubble mould parts on the rigid portion 11 which do not have sharp edges, resist catching and are less likely to cause injury to another animal. In this connection, it is important that the collar 10 presents a smooth surface with relatively few chances for snagging to reduce the danger of hanging the animal by the neck or catching the animal, such as to a fence or branch, which could lead to inconvenience or injury, particularly where the animal is prompted to struggle.

Figure 6:
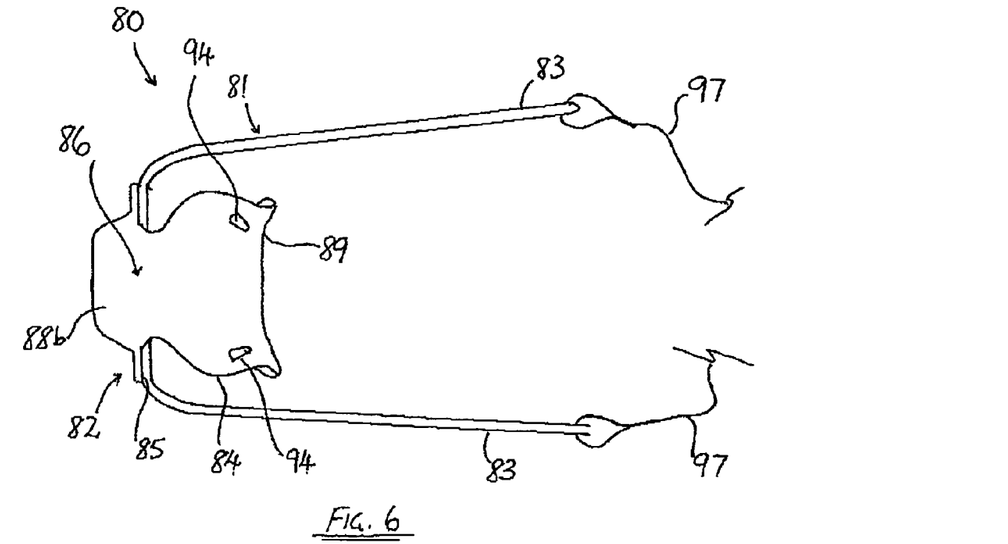
FIG. 6 is a top plan drawing of a fourth embodiment utilising a piezo-electric device applicable to a horse.
Figure 7:
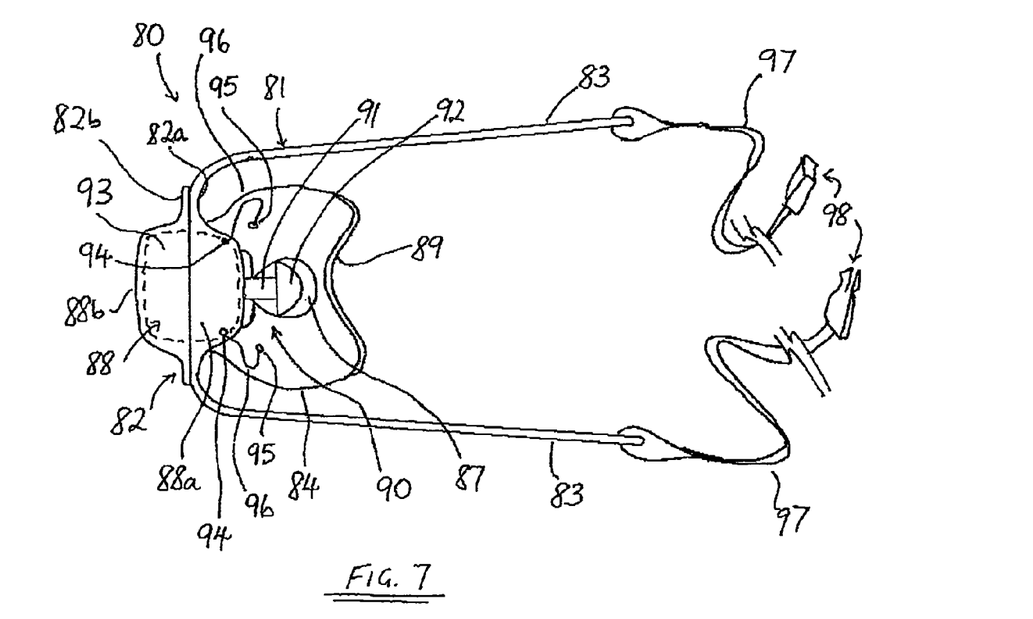
FIG. 7 is a bottom plan drawing of the fourth embodiment.
Figure 8:
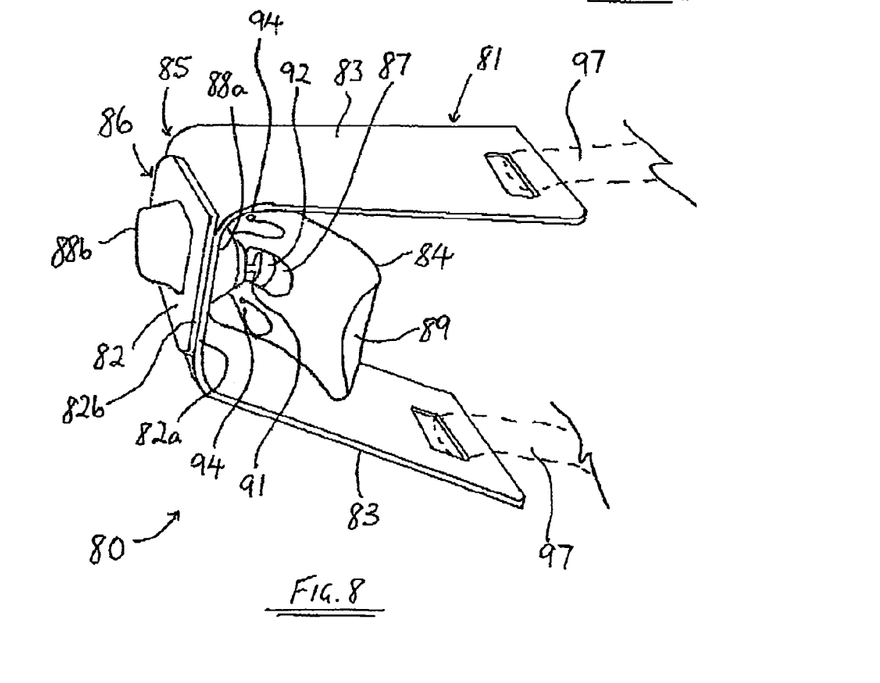
FIG. 8 is a perspective view of the fourth embodiment.

Referring to FIGS. 6 to 8, there is shown a wind sucking deterrent device 80 having a U-shaped bracket 81 with a base 82 and a pair of extending diverging arms 83 integrally attached to the base 82. Also attached by a hinge 86 to the base 82 is a lever member in the form on an elongate tongue 84 extending from a lowermost edge 85 of the base 82 between and then above the arms 83. The tongue 84 is curved in a bow shape to accommodate the contours of the front of a horse's neck and to provide a comfortable, non-irritating surface for the animal when behaving normally.

Interposed between the base 81, the tongue 84 and the arms 83 is the piezo-electric device 90 mounted in the wall of the base 82. The device 90 comprises a linearly movable shaft 91 spring-biased to an extended position and compressible to activate the piezo-electric device 90 to deliver an electric pulse on application of sufficient force.

The hinge 86 consists of a weakened bridge extending as an integral connection from the base edge 85 so that the U-shaped bracket 81 and tongue 84 can be integrally formed, such as by injection moulding. However, it will be appreciated that the tongue 84 may be formed separately compared to other components of the U-shaped bracket 81. The hinge 86 may be made flexible by having a thin wall or comprising a narrow transverse area relative to the tongue 84. Alternatively, the hinge may involve a pin/axle arrangement biased to an open position by spring means.

As shown in the fourth embodiment in FIG. 7, the base 82 may comprise a pair of substantially coplanar and coextensive walls 82a,82b. The inner wall 82a may be integrally formed with the arms 83, whereas the outer wall 82b may be integrally formed with the tongue 84. The inner and outer walls 82a,82b may be joined to each other by standard means such as heat welding, solder, welding, adhesive or pop rivets, etc.

Optionally, the inner and outer walls 82a,82b include cup shaped pockets 88a,88b which together form a cavity central to the base 82. The cavity provides a water-proof and otherwise protective housing 88 for the main body 93 of the piezo-electric device 90.

The tongue 84 includes a groove 87 opposed to the broad head 92 of shaft 91. In use, sufficient force is applied to the tongue 84 so that the remote non-hinged end 89 is rotated about the hinge 86 towards the base 82. The groove 87 cooperates with the head 92 to compress a spring in the piezo-electric device 90 until a trigger in the piezo-electric device 90 is triggered thereby activating the charge generating means of the piezo-electric device 90. Thus the levered mechanical energy applied to the tongue 84 is, in part, converted into an electrical pulse.

The terminals 94 of the piezo-electric device 90 are electrically connected to a pair of electrodes 95 located on the tongue 84 by flexible leads 96. The electrodes 95 include protruding members whereby to ensure good contact is made with the animal, particularly its skin.

Attached to the respective free ends of the arms 83 are adjustable length, flexible straps 97 having buckles 98 so that the device 80 can be strapped around a horse's neck and secured by the complementary and engageable buckles 98.

In use, the device 80 is strapped to the horse's neck and positioned so that the electrodes 95 sit opposed and spaced from the horse's larynx. The remote end 89 of the tongue 84 rests against the animal's neck in a tight but comfortable fit. If the horse commences the wind sucking action, the omohyoideus and/or the sterno thyrohyoideus muscle or muscle group expands, the electrodes are rotated into contact with the horse's neck, if not already in contact, the tongue 84 is compressed towards the base 82, thereby triggering the piezo-electric device 80 to deliver a high voltage, low current pulse to the horse's neck.

Figures 5A, 5B:
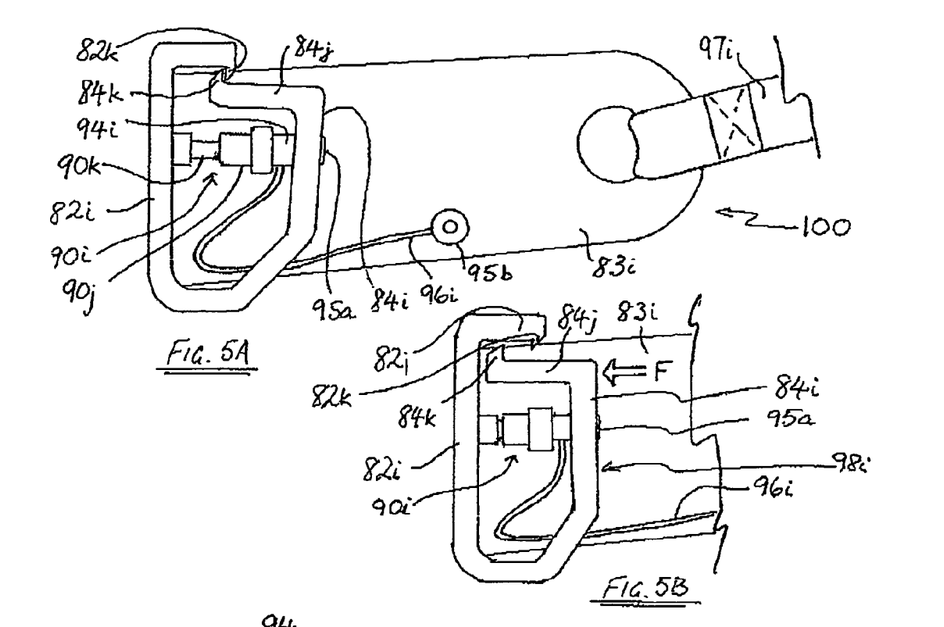
FIG. 5A is a sectional side view of a device according to the third embodiment of the invention.
FIG. 5B is a sectional side view of the third embodiment in activated state.

Referring to FIGS. 5A and 5B, there is shown a third embodiment of the invention, in the form of U-shaped collar 100 and therefore like features will be described with reference to like numerals. The collar 100 is similar to the fourth embodiment except that the tongue 84i has a different shape and the base 82i, tongue 84i and arms 83i (only one shown) are integrally formed. The tongue 84i features a primary electrode 95a and a secondary electrode 95b. The secondary electrode 94b is located on one of the arms 83i and is in communication with the corresponding piezo-electric device's 90i terminal 94i by an electrically conducting flexible wire 96i. The primary terminal or electrode 95a has a relatively broad surface with which to contact the animal's throat surface on exhibiting the wind-sucking behaviour. Although the primary electrode 95a may be in constant contact with the animal's throat close to or on the larynx, this is not necessary as long as the primary electrode 95a moves into good conductive contact with the animal upon it exhibiting the wind-sucking behaviour. Conversely, the side secondary electrode 95b is typically permanently in contact with the side of the animal's larynx or neck so that a change in muscular conformation or dimension is not required to bring the electrode 95b into contact with the animal's skin or other conductive surface.

As best shown in FIG. 5B, activation of the piezo-electric device 90i occurs by application of a sufficient force F to the outer face 98i of the tongue 84i. The spring-biased device 90i is axially compressed whereby to generate an electric pulse that is delivered through electrodes 95a and 95b.

The main body 90j of the device 90i is axially slidable along a shaft 90k, but is spring-biased to the non-compressed state shown in FIG. 5A. The tongue's 84i free end 84j includes stop means 84k in the form of a lip extending upwardly from the free end 84j and engageable by abutment to a detent means 82k in the form of a lip depending downwardly from an extension 82j of the base 82. The stop means 84k and the detent means 82k cooperate against the spring bias to limit the travel of the free end 84j relative to the extension 82j.

On application of the force F to the outer face 98i, the stop means 84k is pushed away from the detent means 82k until the main body 90j or the stop means 84k reaches the end of its travel as the electric pulse is generated. The extension 82j is preferably coextensive and integrally formed with the base 82i, although it may be shorter or longer in width. The stop means 82k may similarly extend the width of the base 82i or may be shorter or longer in width, as long as the detent means 82k and the stop means 84k are suitably positioned for engagement in the non-compressed, inactivated position.

As with the first and second embodiments, the device 100 includes means for engaging the animal's neck in the form of a pair of straps 97i terminating in mutually engageable buckles (not shown). The straps are preferably adjustable in length and releasable by an operator, but not easily inadvertently releasable, such as by the animal itself. The straps 97i are made from woven webbing similar to seat belt material, such as polyester. The moulded base 82i, arms 83i and tongue 84i may be made from any of a number of relatively inexpensive, commercially available polymers having good strength and resilience properties, such as polypropylene.

The arrangement shown FIGS. 5A and 5B can be further modified whereby a dog lead is physically linked to a collar arrangement in which the collar includes a lever activatable piezo switch. The lever may be spring biased and resting against or in close proximity to the dog's throat. A sudden forward lunge will be effective to compress the lever and to activate the piezo switch, thereby delivering a shock to the animal to correct the undesirable behaviour, such as lunging at a passer-by or another animal.

In the inventor's experience, one shock from the devices 1,80,100 is all that is required to correct the wind sucking behaviour, although less responsive individuals or species may require multiple shocks to correct the undesirable behaviour. Nevertheless, repeated shocks spaced sufficiently by time from the device 1,80,100 will not injure the animal or cause enduring discomfort.

INDUSTRIAL APPLICABILITY

It can be seen that the present invention as embodied in the behavioural modification device 1 and the deterrent device 80 provides improved means of modifying an animal's behaviour. The devices 1,80 have been proposed to overcome problem of wind-sucking and the field is the subject of considerable interest due to the high monetary value associated with equine stock, particularly in the racing industry.

Throughout the specification including the claims the word "comprise" and its derivatives are intended to an inclusive rather than exclusive meaning, i.e. that they are taken to mean that not only are the listed components or elements included, but that also other non-specified components or elements may be included, unless expressly stated to the contrary or the context requires otherwise.

It will be appreciated by those skilled in the art that many modifications and variations may be made to the embodiments described herein without departing from the spirit and scope of the invention.

Orientational terms used in the specification including the claims such as vertical, horizontal, top, bottom, upper and lower are to be interpreted as relational and are based on the premise that the component, item, article, apparatus, device or instrument will usually be considered by the skilled person in particular orientation, typically with the collar approximately horizontally aligned.

The invention claimed is:

1. An electric shock device in use attached to a horse or other equine animal to discourage wind-sucking behavior, said device including:
   an attachment for locating the device on the neck of the animal, the attachment comprising a substantially rigid portion and a flexible, adjustable portion;
   an electric charge source operatively connected to said attachment, said electric charge source capable of delivering an electric pulse upon activation;
   electrode means electrically connected to said electric charge source and for applying the electric pulse to the animal; and
   activation means activated in response to the performance by the animal of said wind-sucking behavior alone, said activation means including a lever member comprising a hinged end hinged at or toward the hinged end to the rigid portion and a free, or more movable, remote end, the lever member configured to translate the movement of the animal associated with wind-sucking alone into a movement of sufficient force or of the type required to activate said electric charge source;
   wherein the electric charge source is activated by compression of the lever member thereby applying a force to the remote end, causing the electric pulse to be generated and delivered through the electrode means to the animal.

2. An electric shock device according to claim 1, wherein said activation means is activated in response to the constriction of either the omohyoideus and/or the sternothyrohyoideus muscle by pressing a pressure sensitive switch or a piezo-electric device against the rigid portion.

3. The electric shock device of claim 2, wherein said attachment comprises a collar surrounding the animal's neck, said collar secured at its ends by one or more clips, clamps, fasteners, and/or loops.

4. The electric shock device of claim 2, wherein said lever member is configured to translate the movement of the animal associated with wind-sucking into a small movement of sufficient force to activate said electric charge source being a spring-biased piezo-electric device comprising a spring, by compression of the spring.

5. An electric shock device according to claim 1, wherein the electrode means is located on the lever member.

6. The electric shock device of claim 5, wherein said lever member is configured to translate the movement of the animal associated with wind-sucking into a small movement of sufficient force to activate said electric charge source being a spring-biased piezo-electric device comprising a spring, by compression of the spring.

7. An electric shock device according to claim 1, wherein said lever member is configured to translate the movement of the animal associated with wind-sucking into a small movement of sufficient force to activate said electric charge source being a spring-biased piezo-electric device comprising a spring, by compression of the spring of the piezo-electric device.

8. An electric shock device according to claim 7, wherein said lever member includes an elongate member hinged at or towards a hinged end and a free, or more movable, remote end, the hinged end consisting of a weakened bridge extending as an integral connection between the lever member and the rigid portion.

9. An electric shock device in use attached to an animal to discourage an undesirable behavior associated with a predictable physical movement, said device including:
    an attachment for locating said device on a part of the animal associated with said undesirable behavior, the attachment comprising a substantially rigid portion and a flexible, adjustable portion;
    an electric charge source operatively connected to said attachment, the electric charge source capable of delivering an electric pulse upon activation;
    electrode means for applying an electric pulse from said electric charge source to the animal; and
    a hinged lever member comprising a hinged end hinged at or toward the hinged end to the rigid portion and a free, or more movable, remote end, the lever member movable by the performance of said undesirable behavior by the animal, said undesirable behavior alone causing sufficient movement or the type of movement of said lever member required to activate said electric charge source leading to the discharge of said electric pulse from said electric charge source.

10. An electric shock device according to claim 9, wherein said electric charge source is a spring biased piezo-electric device capable of delivering an electric pulse upon mechanical activation by compression of the piezo-electric device, said lever member applying a compressive force when moved by the performance by the animal of said undesirable behavior alone.

11. An electric shock device according to claim 9, wherein said undesirable behaviour is expressed by the action or activation of at least one muscle or muscle group.

12. An electric shock device according to claim 11, wherein said at least one muscle is from the group consisting of the omohyoideus and sternothyrohyoideus muscles.

13. An electric shock device according to claim 9, wherein said undesirable behaviour is wind-sucking and the animal is a horse or other equine animal.

14. The electric shock device of claim 9, wherein said undesirable behavior is expressed by the action or activation of at least one muscle or muscle group.

15. The electric shock device of claim 14, wherein said undesirable behavior is wind-sucking.

16. An electric shock device in use attached to an equine animal to discourage wind-sucking behavior, the device comprising:
    an attachment for locating the device on the equine animal's neck;
    an electric charge source operatively connected to the attachment, the electric charge source able to deliver an electric pulse upon activation thereof;
    an electrode, electrically connected to the electric charge source, for applying an electric pulse from the electric charge source to the equine animal; and
    an activator, activated in response to the performance by the animal of the wind-sucking behavior alone, the activator comprising a lever member configured to translate the movement of the animal associated with wind-sucking alone into a movement of sufficient force or of a type required to activate the electric charge source;
    wherein:
    (a) the attachment comprises a substantially rigid portion and a flexible, adjustable portion;
    (b) the lever member includes an elongate member hinged at or toward a hinged end and a free, or more movable, remote end, the hinged end hinged to the substantially rigid portion; and
    (c) the electric charge source is activated by compression of the lever member, primarily by a force applied to the remote end, thereby causing the electric pulse to be generated and delivered through the electrode to the equine animal.

17. An apparatus in use attached to an animal to discourage an undesirable behavior associated with a predictable physical movement, the apparatus including:
    an attachment for locating the device on a part of the animal associated with the undesirable behavior;
    a piezo-electric device operatively connected to the attachment;
    electrode means for applying an electric pulse from the piezo-electric device to the animal; and
    a hinged lever member movable by the performance of the undesirable behavior by the animal, the undesirable behavior alone causing sufficient movement or a type of movement of the lever member required to activate the piezo-electric device leading to the discharge of the electric pulse from the piezo-electric device.

* * * * *

UNITED STATES PATENT AND TRADEMARK OFFICE
CERTIFICATE OF CORRECTION

PATENT NO.         : 7,757,640 B2
APPLICATION NO.    : 11/597029
DATED              : July 20, 2010
INVENTOR(S)        : Richard Barclay It is certified that error appears in the above-identified patent and that said Letters Patent is hereby corrected as shown below:

On the title page:
In ITEM (30) Foreign Application Priority Data
change "(AT)" to --(AU)--

In the specification:
COLUMN 7, LINE 14, change "Sterno" to --sterno--

Signed and Sealed this
First Day of March, 2011

David J. Kappos
*Director of the United States Patent and Trademark Office*